United States Patent
Choi (10) Patent No.: US 9,907,397 B2
(45) Date of Patent: Mar. 6, 2018

(54) CLIP FOR FIXING PIPE

(71) Applicant: Sung Mook Choi, Namyangju-si (KR)

(72) Inventor: Sung Mook Choi, Namyangju-si (KR)

( * ) Notice: Subject to any disclaimer, the term of this patent is extended or adjusted under 35 U.S.C. 154(b) by 0 days.

(21) Appl. No.: 15/181,865

(22) Filed: Jun. 14, 2016

(65) Prior Publication Data

US 2017/0042326 A1   Feb. 16, 2017

(30) Foreign Application Priority Data

Aug. 11, 2015 (KR) .......................... 20-2015-0005348

(51) Int. Cl.

| | |
|---|---|
| *A47B 57/54* | (2006.01) |
| *F16B 2/24* | (2006.01) |
| *E04B 9/20* | (2006.01) |
| *A47B 57/56* | (2006.01) |
| *A47B 96/06* | (2006.01) |
| *F16B 9/02* | (2006.01) |
| *A47B 57/26* | (2006.01) |

(52) U.S. Cl.
CPC .............. *A47B 57/54* (2013.01); *A47B 57/56* (2013.01); *A47B 57/567* (2013.01); *A47B 96/06* (2013.01); *E04B 9/205* (2013.01); *F16B 2/241* (2013.01); *F16B 2/246* (2013.01); *F16B 9/023* (2013.01); *A47B 57/26* (2013.01)

(58) Field of Classification Search
CPC ....... A47B 57/567; A47B 57/56; A47B 57/54; A47B 57/26; A47B 96/06; E04B 9/205; F16B 2/241; F16B 2/246; F16B 9/023
See application file for complete search history.

(56) References Cited

U.S. PATENT DOCUMENTS

| | | | | |
|---|---|---|---|---|
| 2,685,720 | A | * | 8/1954 | Petri ....................... F16B 2/241 403/206 |
| 2,894,774 | A | * | 7/1959 | Dudash .................... B60S 1/24 15/250.27 |
| 2,925,295 | A | * | 2/1960 | Boehlow ................. F16B 2/241 403/208 |

(Continued)

FOREIGN PATENT DOCUMENTS

| | | | | |
|---|---|---|---|---|
| DE | 29500353 U1 | * | 2/1995 | ............. E04B 9/205 |
| DE | 102008006917 A1 | * | 7/2009 | ............. H02G 3/263 |

(Continued)

*Primary Examiner* — Eret C McNichols
(74) *Attorney, Agent, or Firm* — Paratus Law Group, PLLC (57) ABSTRACT

The object of the present device is to provide a fixing clip for a pipe wherein the pipe can be inserted into and fixed at the clip which is constituted into one structure and a shelf can be combined to the fixed clip so that articles can be positioned or decorated on the shelf. To achieve the above object, the present device comprises a first body formed with a first hole into which the pipe is inserted; a second body formed with a second hole into which the pipe is inserted; a connection section which combines ends of the first body and the second body and elastically presses the other ends of the first body and the second body so as to be pushed away from each other; and a fixing section to which the other end of the first body or the second body is connected, wherein the first body and the second body can be fixed at or escape from the pipe according to the angle between the center axis of the first hole and the center axis of the second hole.

2 Claims, 8 Drawing Sheets

(56) References Cited

U.S. PATENT DOCUMENTS

| | | | | |
|---|---|---|---|---|
| 2,968,850 A * | 1/1961 | Tinnerman | ............ | A47B 57/56 248/316.7 |
| 2,971,355 A * | 2/1961 | Walsh | ............ | F16B 2/246 217/60 R |
| 3,023,473 A * | 3/1962 | Cochran | ............ | F16B 2/241 24/543 |
| 3,233,297 A * | 2/1966 | Havener | ............ | E04B 9/205 248/125.1 |
| 3,562,873 A * | 2/1971 | Cumber | ............ | F16B 2/246 403/397 |
| 5,102,074 A * | 4/1992 | Okada | ............ | F16L 3/24 248/59 |
| 5,482,240 A * | 1/1996 | Caraher | ............ | E04B 9/205 248/297.51 |
| 5,595,312 A * | 1/1997 | Dardashti | ............ | A47B 57/34 211/188 |
| 6,619,627 B2 * | 9/2003 | Salisbury | ............ | A01K 3/00 256/1 |
| 8,157,235 B2 * | 4/2012 | Quertelet | ............ | H02G 3/0443 211/26 |
| 8,985,375 B2 * | 3/2015 | Kohles | ............ | A47L 15/503 211/41.8 |
| 9,080,695 B2 * | 7/2015 | Magno, Jr. | ............ | F16L 3/227 |
| 9,322,169 B2 * | 4/2016 | Magarelli | ............ | F16B 2/246 |
| 2016/0168852 A1 * | 6/2016 | Bergman | ............ | E04B 9/366 52/39 |

FOREIGN PATENT DOCUMENTS

| | | | | |
|---|---|---|---|---|
| EP | 0066143 A2 * | 12/1982 | ............ | E04H 17/10 |
| FR | 2808432 A1 * | 11/2001 | ............ | A47B 43/003 |
| FR | 2923560 B1 * | 2/2010 | ............ | E04B 9/205 |
| GB | 1371631 A * | 10/1974 | ............ | F16B 2/246 |
| GB | 1388841 A * | 3/1975 | ............ | F16B 1/04 |
| WO | WO-02084161 A1 * | 10/2002 | ............ | A01G 17/08 |

* cited by examiner

CLIP FOR FIXING PIPE

CROSS-REFERENCE TO RELATED APPLICATIONS

This application claims the benefit of foreign priority of Korean Patent Application No. 10-2015-0005348 filed Aug. 11, 2015, the subject matter of which is hereby incorporated by reference in its entirety.

BACKGROUND (a) Technical Field

The present device relates to a fixing clip for a pipe, and in particular, it relates to a fixing clip for a pipe which can move and fix the position of a shelf by fixing the clip to the pipe.

(b) Background Art

In general, a shelf is used to place, deposit or display articles on it. The structure of the shelf becomes simplified to achieve an effect of indoor or outdoor interior, and the shelf of high safety is preferred according to the simplification.

A lot of technologies are being developed for simplification and raising the safety of the combination structure to construct the shelf.

As an example of the conventional technology, there is disclosed a multiple step shelf which comprises a support pipe on which plural locking holes are formed at the outer circumference side along the entire length in the up and down direction and which is constructed is multiple steps so as to be able to be expanded or contracted; a shelf fixing tool including a fixing body of which both ends wraps a part of circumference of the support pipe, which is mounted to and removed from a locking hole of the support pipe, and which supports a lower part of a shelf connection tie, and a combination body which wraps the remaining part of circumference of the support pipe and is mounted to and removed from the fixing body; and a shelf connection tie which is supported to the shelf fixing tool, to which the article can be placed, or deposited displayed or on which a coat hanger can be hung, wherein the fixing body comprises a first housing section which wraps a part of the outer circumference of the support pipe, a fixing protrusion which is protruded to the outside at the inner circumference of the first housing section so as to be mounted at and removed from the locking hole of the support pipe, a combination protrusion formed at both sides of the first housing section so that the combination body is inserted, and a shelf support section of which the lower part of the shelf connection tie is inserted at the opposite side of the first housing section, the combination body comprises a second housing section which wraps the outer circumference of the support pipe, and a combination groove formed at both sides of the second housing section so as to be inserted into the combination protrusion, the shelf support section comprises a connection tie insertion groove formed to correspond to a section shape of the shelf connection tie so that a lower part of the shelf connection tie is inserted into the connection tie insertion groove, and a connection tie insertion protrusion protruding from the connection tie insertion groove so that a part of the lower part of the shelf connection tie is insertion combined to the connection tie insertion protrusion, and the shelf connection tie has the shelf fixing tool which further comprises a first shelf connection tie on the inner circumference lower part of which is formed a stop protrusion and a second shelf connection tie which is connected to the first shelf connection tie in the multiple step so as to be able to be expanded and contracted, on the outer circumference lower part of which is formed a guide groove guided by the stop protrusion, and which is formed with an interrupting cap which blocks the guide groove and stops the movement of the first shelf connection tie by being latched by the stop protrusion.

However, the conventional technology has problems that it is of complicated structure and uses excessively many parts so that there is a worry of losing the parts in the assembly process.

PRIOR ART DOCUMENT (Patent Document) Korea Publicly laid-on Utility 20-2013-0005317.

SUMMARY OF THE DISCLOSURE

The present device has been made in an effort to solve the above-described problems and the object of the present device is to provide a fixing clip for a pipe wherein the pipe can be inserted into and fixed at the clip which is constituted into one structure and a shelf can be combined to the fixed clip so that articles can be positioned or decorated on the shelf.

To achieve the above object, the present device is characterized in that it comprises a first body formed with a first hole into which the pipe is inserted; a second body formed with a second hole into which the pipe is inserted; a connection section which combines ends of the first body and the second body and elastically presses the other ends of the first body and the second body so as to be pushed away from each other; and a fixing section to which the other end of the first body or the second body is connected, wherein the first body and the second body can be fixed at or escape from the pipe according to the angle between the center axis of the first hole and the center axis of the second hole.

In the present device, the fixing section further comprises a latching section for controlling the rotation of the other end of the first body or the second body.

In addition, in the present device, a latching groove to which the latching section is fixed can be formed at the other end of the first body or the second body.

In addition, in the present device, at the second body, a pressing member which is pressed by an external force can be formed in a protruding shape.

In the present device, a predetermined angle is formed by the connection section between a center axis of the first hole and a center axis of the second hole, so that the first body and the second body are fixed at the outer circumference of the pipe and when the user presses the pressing member so that the other ends of the first body and the second body adjoin each other, the center axis of the first hole and the center axis of the second hole are positioned close to a co-axis so that the first body and the second body can be rotated at the pipe.

(Effect of the Present Device)

The present device has an effect that the pipe can be inserted into the clip for pipe and the shelf can be combined to the fixed clip so as to be easily assembled.

In addition, the fixing clip for a pipe of the present device has an effect that it fixes or moves at least one of the first body and the second body by pressing them.

DETAILED DESCRIPTION

First, a shelf to which a fixing clip for a pipe is combined will be described before describing the fixing clip for the pipe of the present device.

In general, the shelf can be an aid to a user in using a space by being fixed to a wall and can produce a well-organized atmosphere by including a function of organization capable of display and reception of various articles.

The shelf described above can be used in a single layer or multiple layer structure and accordingly products to be used are of various kinds. In case the shelf is formed in a shape of multiple layers, it includes a shelf capable of display and reception of articles, a pipe of supporting the shelf, and clips combined between the shelf and the pipe. In addition, the shelf of the structure described above can be further included in an upper stage and a lower stage.

The present device relates to the fixing clip for the pipe and the structure and the action of a preferred embodiment of the present device will be described below in detail with reference to the accompanying drawings.

Figure 1:
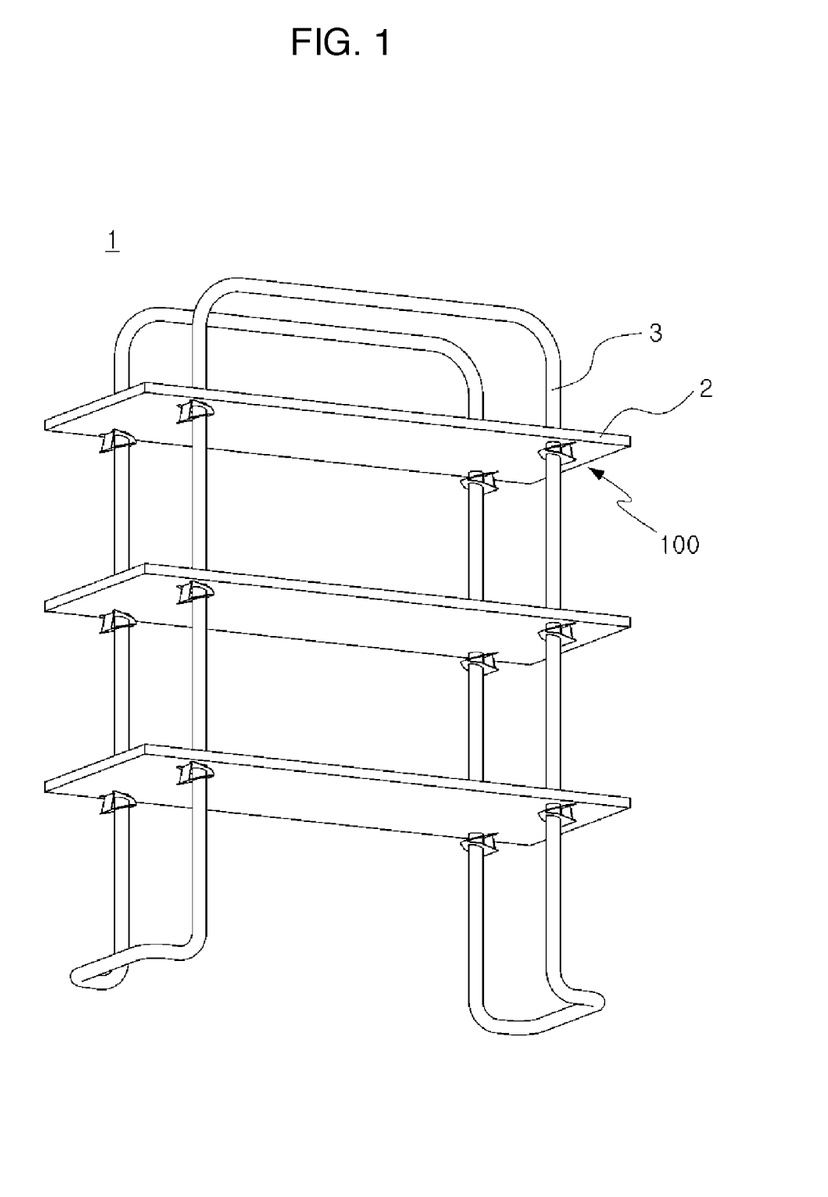
FIG. 1 is a perspective view schematically showing a shelf mounted with a fixing clip for a pipe according to a preferred embodiment of the present device.

FIG. 1 is a perspective view schematically showing a shelf mounted with a fixing clip for a pipe according to a preferred embodiment of the present device. As shown, the shelf 1 includes a reception platform 2 capable of display and reception of articles, a pipe 3 combined to one end of a plurality of edges combining between the reception platform 2 and the reception platform 2, and fixing clips 100 for the pipe combined between the reception platform 2 and the pipe 3.

The fixing clips 100 for the pipe support the reception platform 2 by being combined to the pipe 3.

Figure 2:
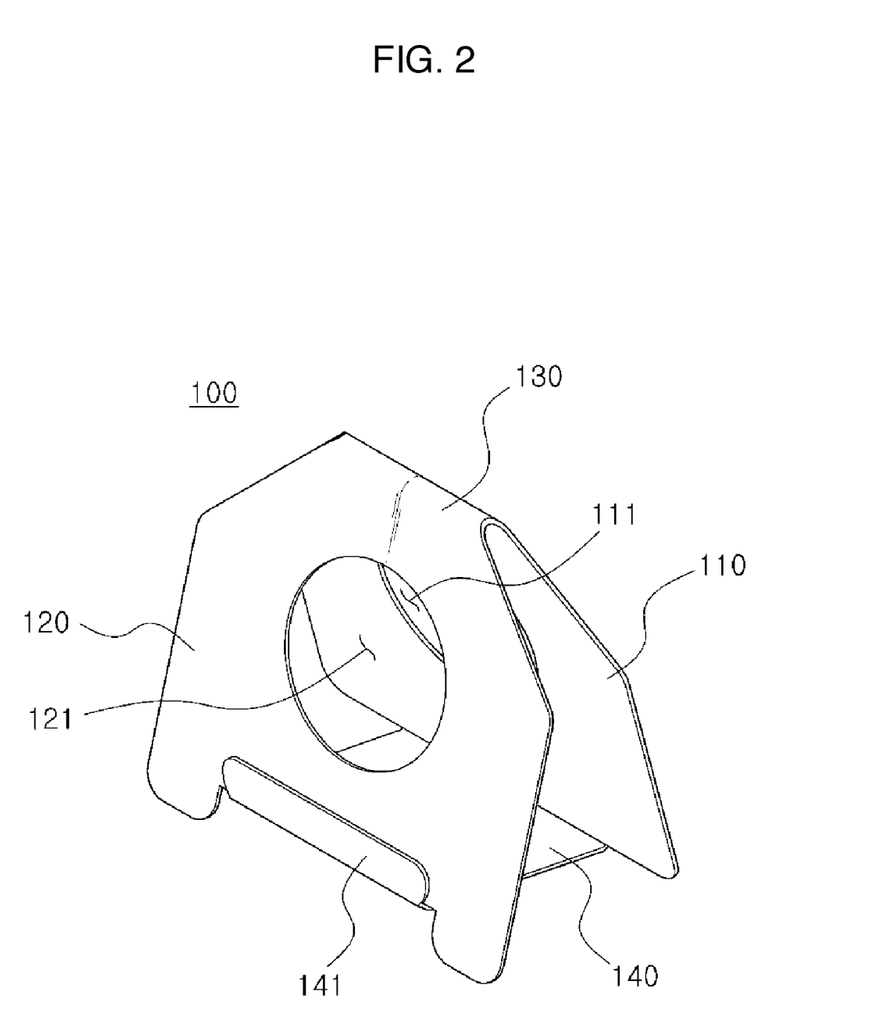
FIG. 2 is a perspective view of the fixing clip for the pipe shown in FIG. 1.

FIG. 2 is a perspective view of the fixing clip for the pipe shown in FIG. 1.

As shown, the fixing clip 100 for the pipe includes a first body 110, a second body 120, a connection section 130, and a fixing section 140.

The first body 110 is formed with a first hole 111 to which the pipe is inserted, the second body 120 is formed with a second hole 121 to which the pipe is inserted. Circumferences forming the first hole 111 and the second hole 121 are closely pushed to the pipe. In addition, the first hole 111 and the second hole 121 may be changed according to the shape of an outside circumference of the pipe.

The connection section 130 presses so that one ends of the first body 110 and the second body 120 are combined and the other ends of the first body 110 and the second body 120 are pushed far. The connection section 130 can be integrally formed so as to have an elastic restoration force, or can press so that the other ends of the first body 110 and the second body 120 are pushed far by adding a separate elastic member to the first body 110 and the second body 120.

The fixing section 140 prevents the other end of the first body 110 or the second body 120 from rotating more than a rotational angle. In addition, the fixing section 140 further includes a latching section 141 for controlling the rotation of the other end of the first body 110 or the second body 120.

Figure 3:
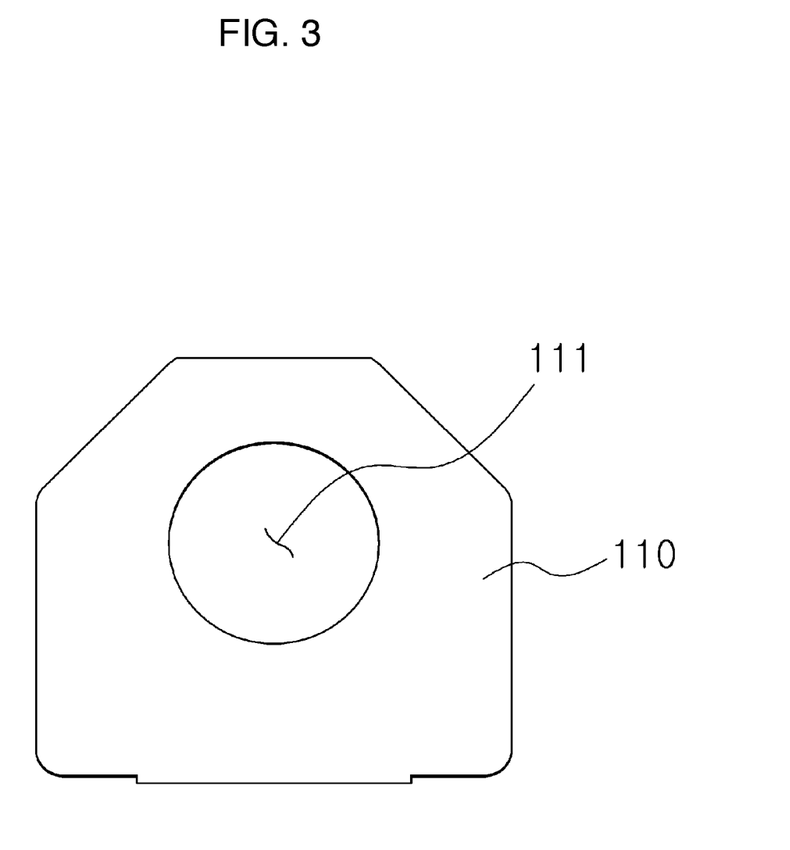
FIG. 3 is a top view showing a first body of the fixing clip for the pipe shown in FIG. 2.

FIG. 3 is a top view showing a first body of the fixing clip for the pipe shown in FIG. 2.

As shown in FIG. 3, a first hole 111 is formed at the first body 110 and the pipe is inserted into the first hole 111. The inner circumference surface can be formed in a shape of a chamfer for inducing the insertion of the pipe.

Figure 4:
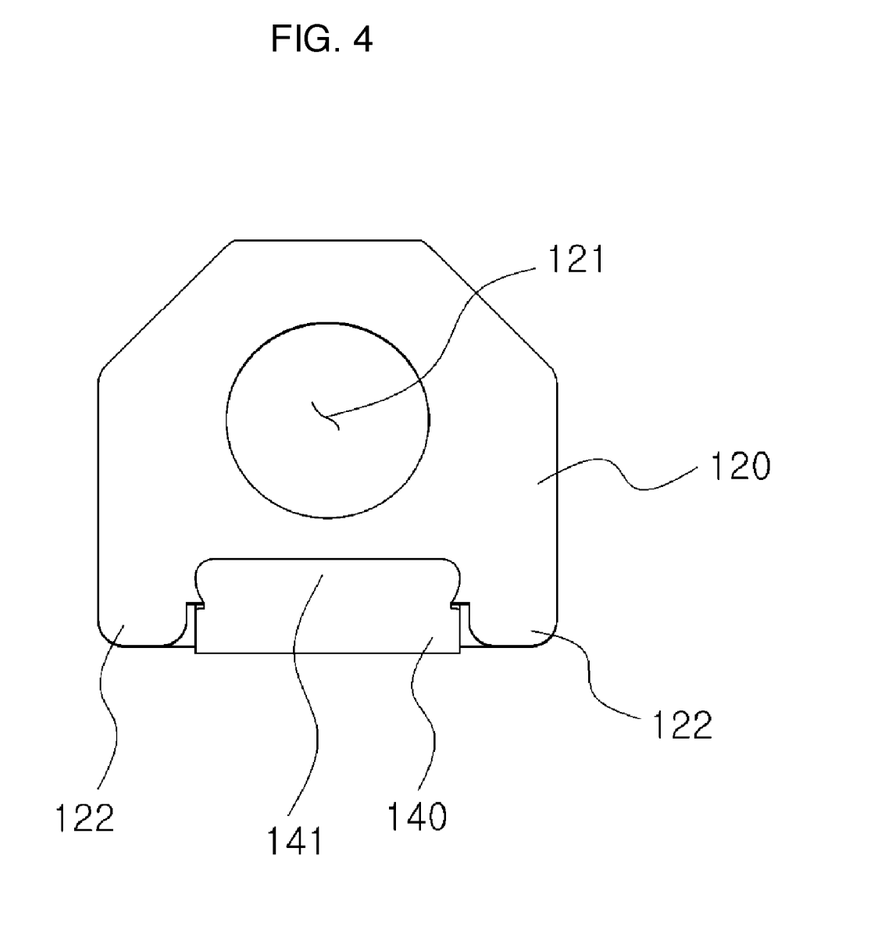
FIG. 4 is a top view showing a second body of the fixing clip for the pipe shown in FIG. 2.

FIG. 4 is a top view showing a second body of the fixing clip for the pipe shown in FIG. 2.

As shown in FIG. 4, a second hole 121 is formed at the second body 120 and the pipe is inserted into the second hole 121. The outer circumference surface can be formed in a shape of a chamfer so as to induce the insertion of the pipe.

A latching groove in a recessed shape is formed at the other end of the second body 120 so that the latching section 141 shown in FIG. 2 is fixed, and a pressing member 122 is formed at both ends of the latching groove. The pressing member 122 is formed at the other end of the second body 120 so that the user can easily press.

Figure 5:
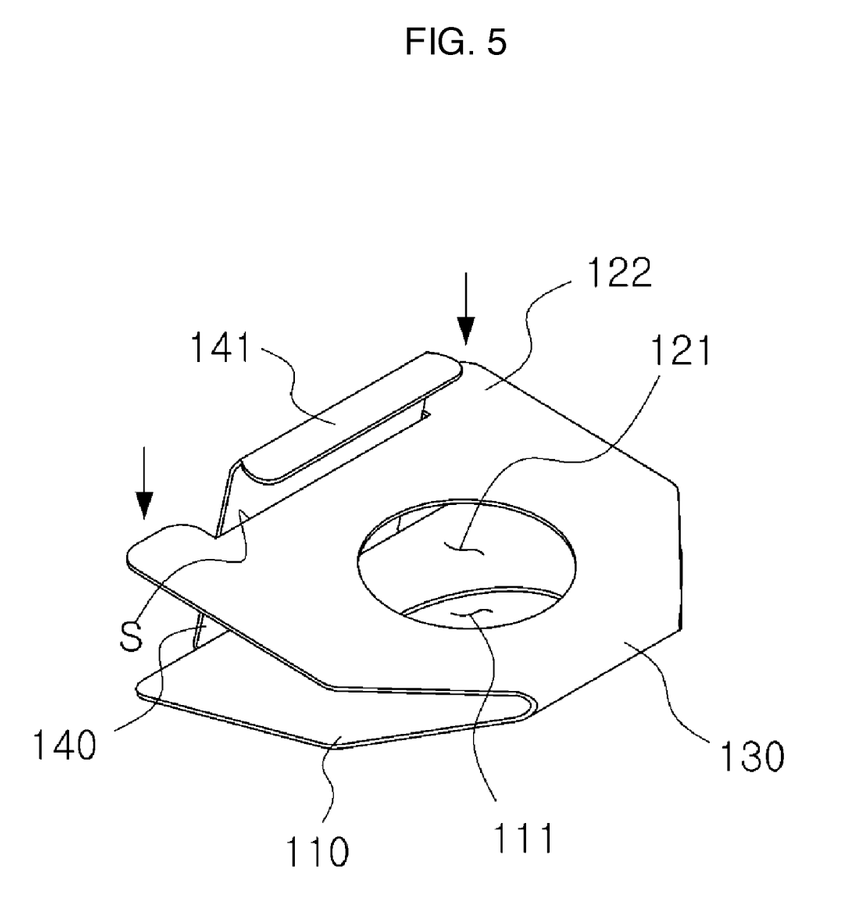
FIG. 5 is a drawing showing a condition of use of the first body and the second body shown in FIG. 2.
Figure 6:
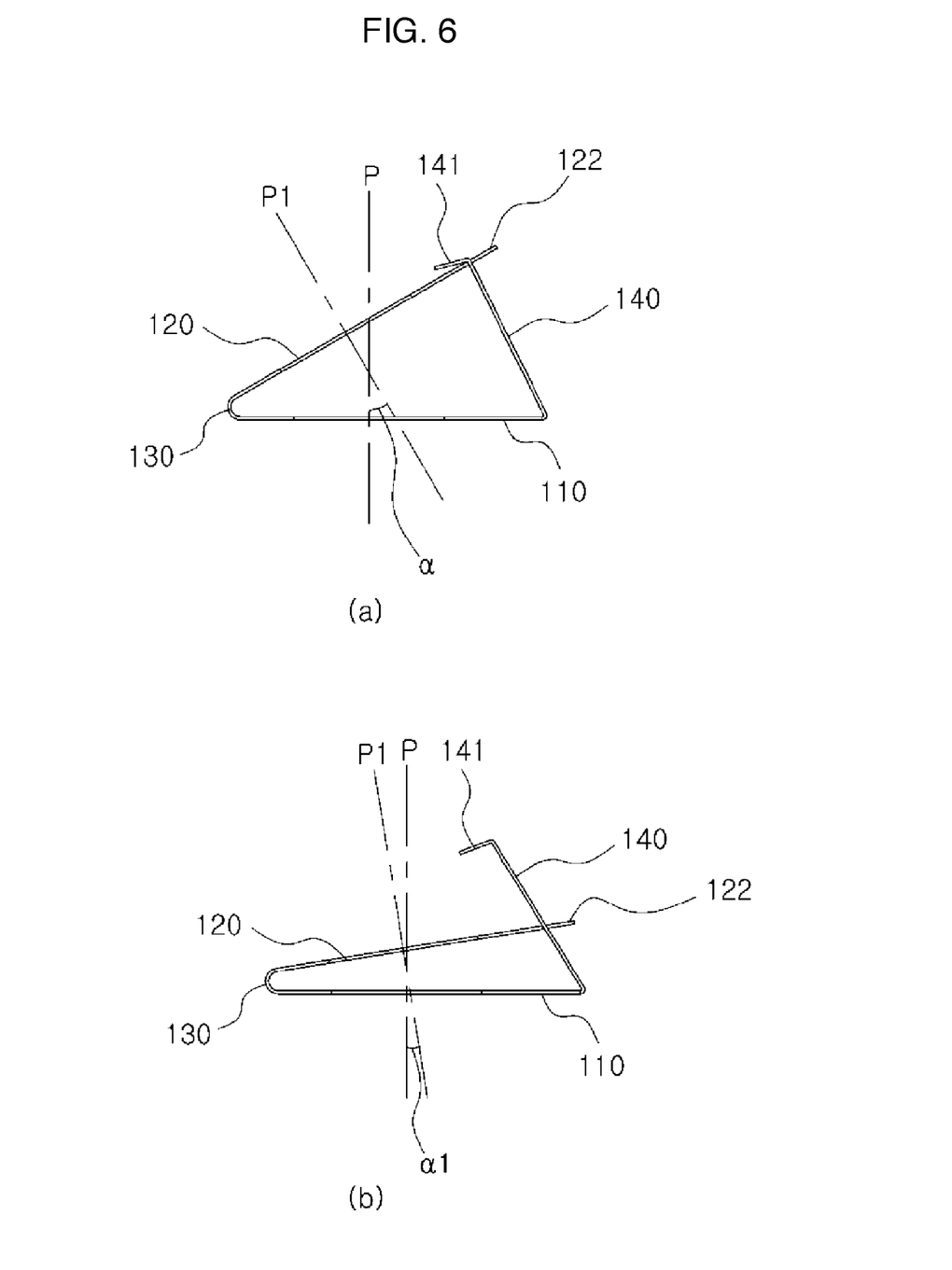
FIG. 6 is a drawing showing a condition of use of the first body and the second body shown in FIG. 2.
Figure 7:
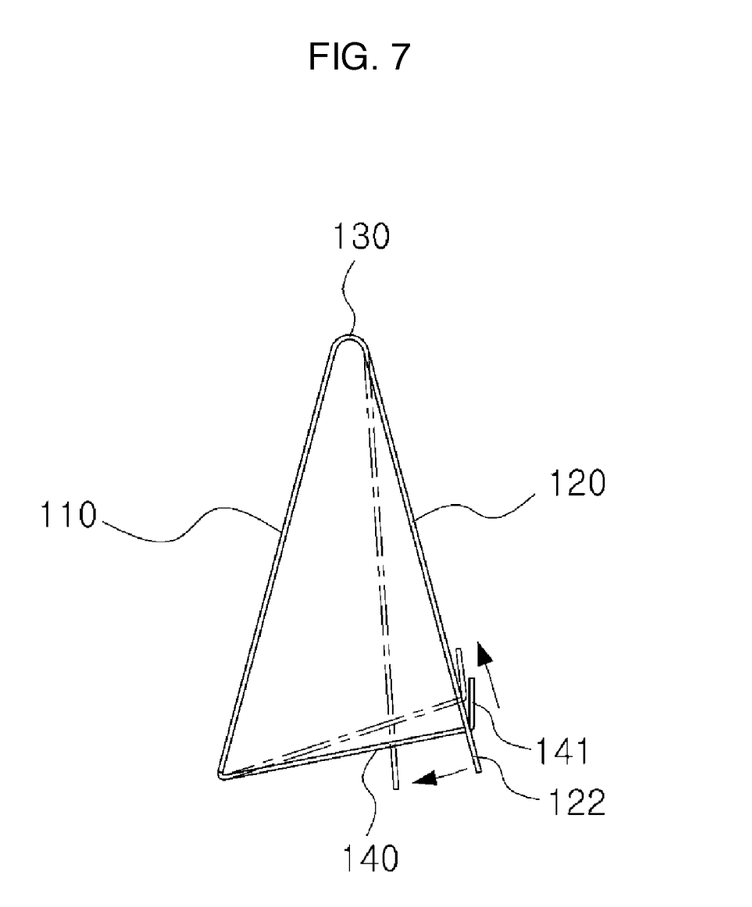
FIG. 7 is a drawing showing a condition of use of the first body and the second body shown in FIG. 2.

FIGS. 5 to 7 are drawings showing a condition of use of the first body and the second body shown in FIG. 2.

First, as shown in FIG. 5, a connection section 130 having the elasticity is formed between the first body 110 and the second body 120. The connection section 130 is pressed so that the other ends of the first body 110 and the second body 120 are pushed away and is restored to the original position again by a restoration force in case the first body 110 and the second body 120 are pressed to adjoin each other.

The fixing section 140, in case the first body 110 and the second body 120 are pressed to adjoin each other and then are restored to the original position by a restoration force, guides the latching groove S formed between a pair of pressing members 122. The pressing member 122 is formed at the second body 120 so as to adjoin the first body 110. The pressing member 122 is pressed by the user and is formed at the opposed second body 120 of the connection section 130.

FIG. 6 is a drawing showing a condition of use of the first body and the second body shown in FIG. 2. In (a) of FIG. 6, the ends of the first body 110 and the second body 120 are spaced by a predetermined distance. At this time, since a first center axis P1 of the first body 110 and a second center axis P of the second body 120 are not coaxial, a first angle a is formed between the first body 110 and the second body 120. In addition, since the larger the first angle a, the force for fixing the pipe becomes larger, the first body 110 and the second body 120 prevent the pipe from moving and escaping.

In (b) of FIG. 6, the ends of the first body 110 and the second body 120 are spaced by an external force by a predetermined distance so as to be nearer than (a) of FIG. 6. Since a first center axis P1 of the first body 110 and a second center axis P of the second body 120 are near at a coaxial axis, a second angle a1 smaller than the first angle a is formed between the first body 110 and the second body 120. Since the smaller the second angle a1 the force fixing the pipe becomes smaller, the first body 110 and the second body 120 let free the moving and escaping of the pipe.

FIG. 7 is a drawing showing a condition of use of the first body and the second body shown in FIG. 2.

As shown, in case the pressing member 122 is pressed so that the first body 110 and the second body 120 adjoin each other, one end of the fixing section 140 combined to the first body 110 is fixed, and the other end of the fixing section 140 and the latching section 141 are rotated toward the first body 110 and the second body 120. One surface of the fixing section 140 is closely pushed to the other end of the second body 120 so as to guide the latching groove S shown in FIG. 5.

Figure 8:
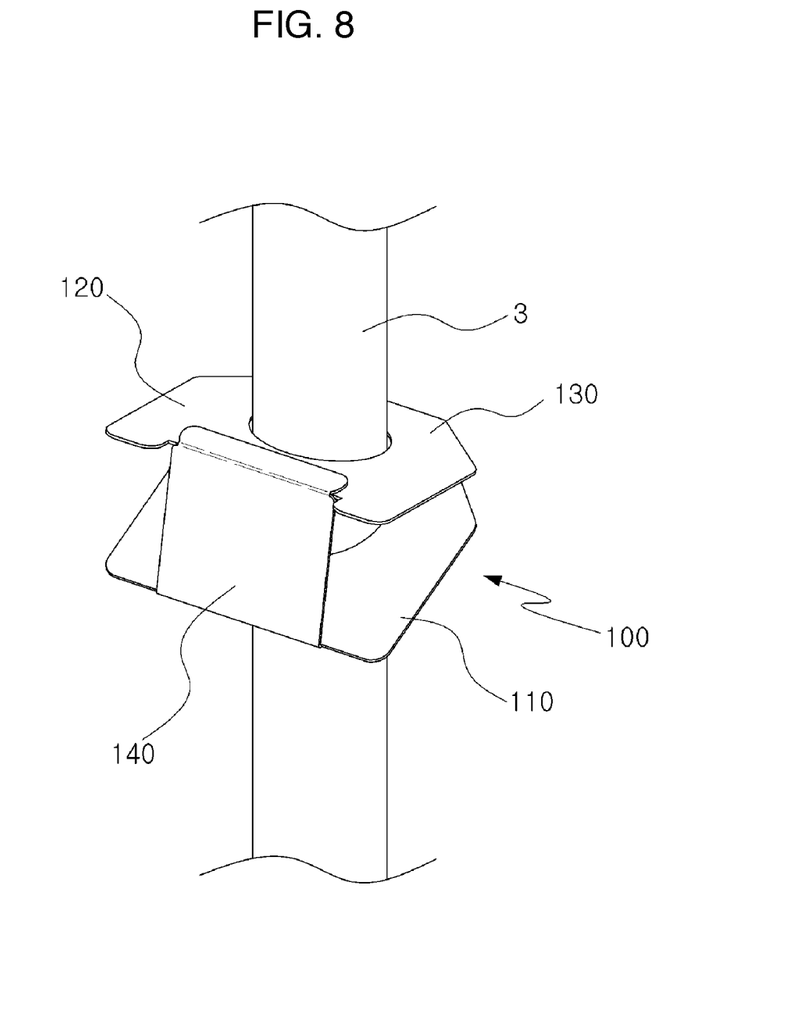
FIG. 8 is a drawing showing a condition of use in which the pipe is inserted into the fixing clip for the pipe according to FIG. 2.

FIG. 8 is a drawing showing a condition of use in which the pipe 3 is inserted into the fixing clip 100 for the pipe shown in FIGS. 2 to 7.

As shown, the first body 110 or the second body 120 is inserted into the upper part or the lower part of the pipe 3. In case the pipe 3 is inserted into the inside of the first body 110 or the second body 120, one of the other ends of the first body 110 and the second body 120 is pressed by the external force so that the first body 110 and the second body 120 adjoin each other and then the pipe 3 is inserted in the first hole or the second hole under the condition that the first body 110 and the second body 120 adjoin. A method of fixing the pipe 3 to a necessary position is that if the external force which has been applied to the first body 110 or the second body 120 is no longer applied, the first body 110 and the second body 120 are fixed by a restoring force of the connection section 130.

The present device is not limited to the embodiments described above, and it will be appreciated by those skilled in the art that changes may be made in these embodiments without departing from the technical thoughts of the present device claimed in the claims and such changes belong to the scope of the present device.

What is claimed is:

1. A clip for fixing a pipe, the clip comprising:
a first plate having a first hole defined therein;
a second plate having a second hole defined therein, wherein the first and second plates encounter with each other at a connection portion so as to form an encountering angle therebetween;
a third plate fixed to a distal end of the second plate, wherein the third plate extends to a distal end of the first plate;
an elongate cut portion defined at the distal end of the first plate, wherein the cut portion extends in a length-direction of the distal end of the first plate along the distal end of the first plate; and
a movement-limiter formed at a distal end of the third plate in a length direction thereof along the distal end of the third pate, wherein the movement-limiter is engaged with the elongate cut portion,
wherein the distal end of the first plate is elastically movable between the movement-limiter and the distal end of the second plate such that the encountering angle varies, and
wherein the distal end of the first plate is elastically movable from the movement-limiter to the distal end of the second plate while the third plate is received in the elongate cut portion.

2. The fixing clip of claim 1, wherein the distal end of the third plate is received in the elongate cut portion and the movement-limiter bends from the distal end of the third plate toward the connection portion.

\* \* \* \* \*